April 13, 1948.   H. N. OTT   2,439,525
FINE ADJUSTMENT OF MICROSCOPE OBJECTIVE
Filed March 30, 1944   3 Sheets-Sheet 1

INVENTOR
Harvey N. Ott,
BY
Parker, Prochnow & Farmer,
ATTORNEYS

April 13, 1948.  H. N. OTT  2,439,525
FINE ADJUSTMENT OF MICROSCOPE OBJECTIVE
Filed March 30, 1944  3 Sheets-Sheet 2
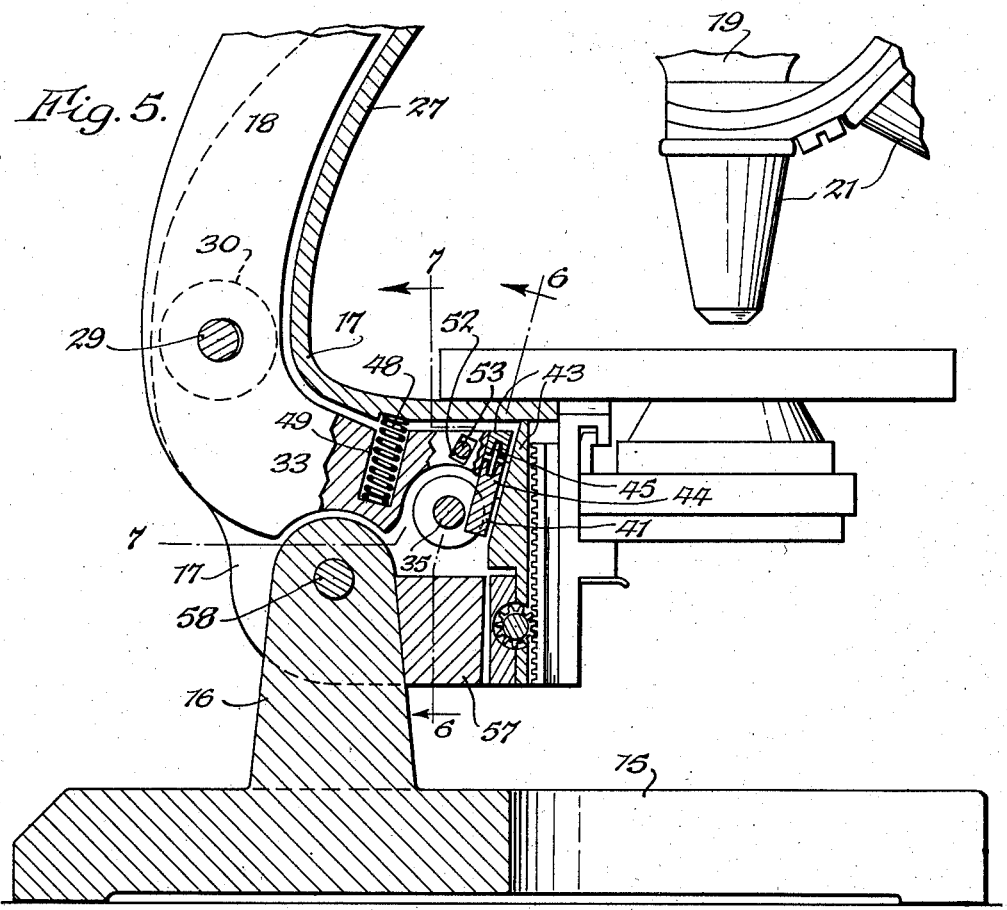
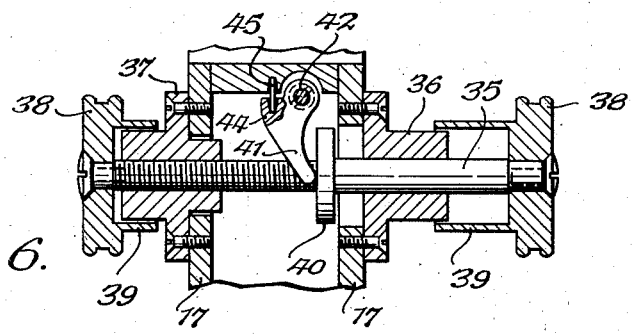
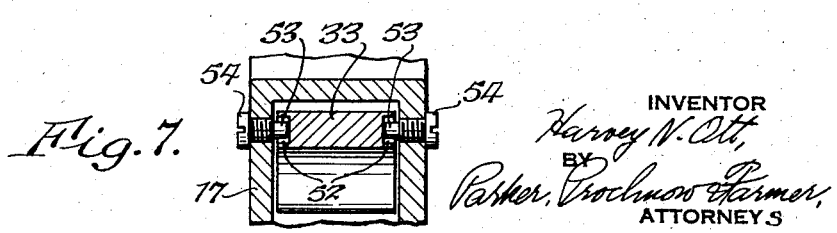
INVENTOR
Harvey N. Ott,
BY
Parker, Crochnow & Farmer,
ATTORNEYS April 13, 1948.    H. N. OTT    2,439,525
FINE ADJUSTMENT OF MICROSCOPE OBJECTIVE
Filed March 30, 1944    3 Sheets-Sheet 3
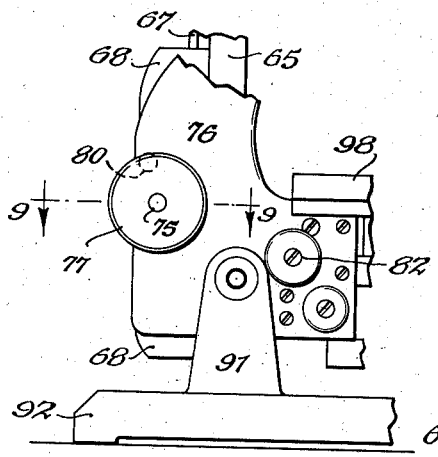
Fig. 8.
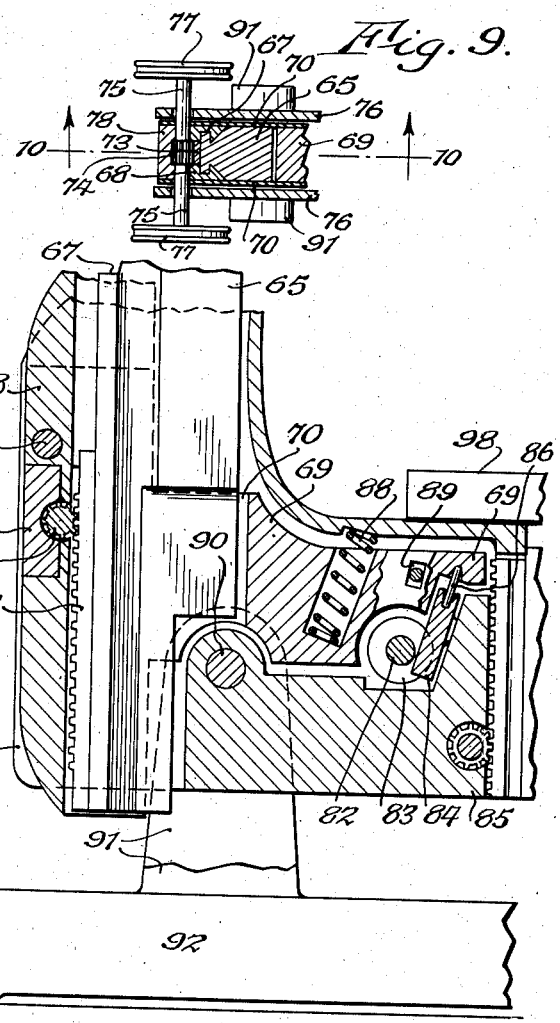
Fig. 9.
Fig. 10.
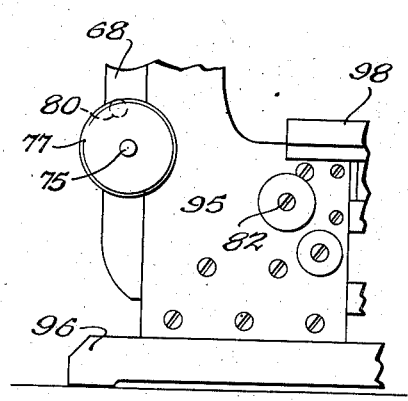
Fig. 11.
INVENTOR
Harvey N. Ott,
BY
Parker, Prochnow & Parmer,
ATTORNEYS Patented Apr. 13, 1948

2,439,525

UNITED STATES PATENT OFFICE 2,439,525

FINE ADJUSTMENT OF MICROSCOPE OBJECTIVE

Harvey N. Ott, Buffalo, N. Y.

Application March 30, 1944, Serial No. 528,686

9 Claims. (Cl. 88—39)

This invention relates to improvements in microscopes.

One of the objects of this invention is to provide a microscope in which the arm which carries the body tube including the eyepiece and objective or objectives is pivotally mounted on the main frame or support of the microscope, and in which the fine adjustment of the body tube is effected by swinging the arm about its pivot. A further improvement is to provide a microscope of this type in which a part of the arm beyond the pivot extends below the stage of the microscope and is acted upon by the fine adjustment propelling mechanism for producing fine adjustment of the body tube relatively to the stage. A further object is to provide a microscope of this type which is so constructed that the horizontal component of the arc about which the objective swings during fine adjustment is compensated for, so that the objective moves up and down in a substantially straight line.

It is also an object of this invention to provide a microscope of this type in which both fine and coarse adjustment mechanisms are located below the level of the stage.

Other objects and advantages of this invention will appear from the following description and claims.

In the accompanying drawings:

Fig. 1 is a side elevation and Fig. 2 a rear elevation of a microscope embodying this invention.

Figs. 3 and 4 are sectional plan views thereof, on an enlarged scale, respectively on lines 3—3 and 4—4 of Fig. 1.

Fig. 5 is a fragmentary sectional elevation of this microscope.

Figs. 6 and 7 are fragmentary sectional elevations thereof, on lines 6—6 and 7—7 respectively of Fig. 5.

Fig. 8 is a fragmentary side elevation of a microscope of modified construction.

Fig. 9 is a fragmentary sectional plan view thereof, on line 9—9, Fig. 8.

Fig. 10 is a fragmentary central sectional elevation thereof, on an enlarged scale on line 10—10, Fig. 9.

Fig. 11 is a fragmentary side elevation of the microscope of still another modified form.

Figure 1:
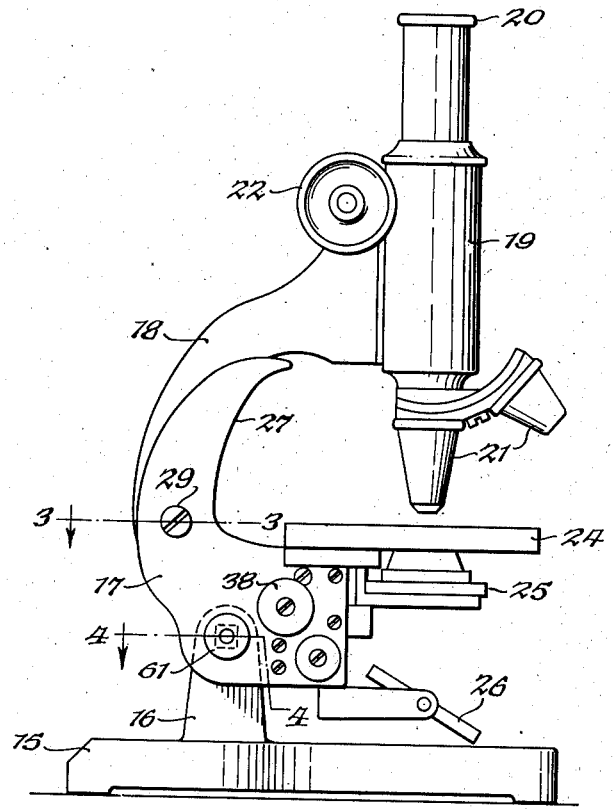
Figure 2:
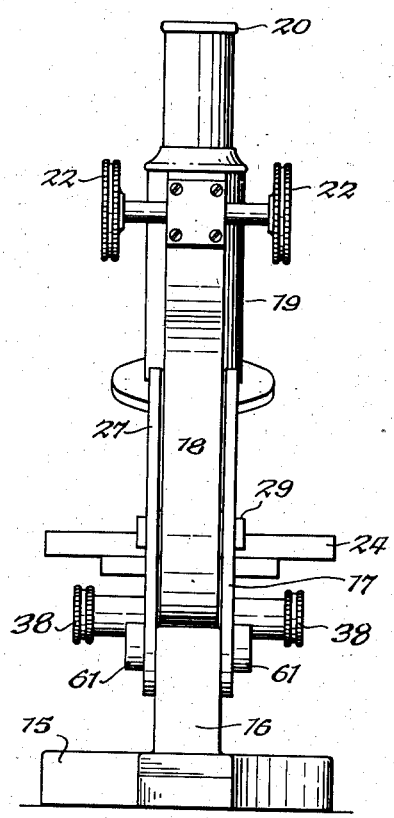
Figure 3:
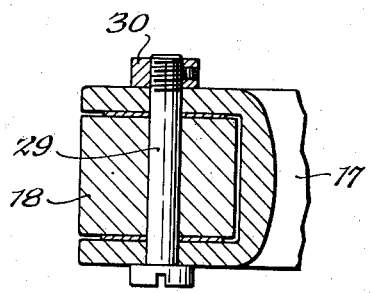
Figure 4:
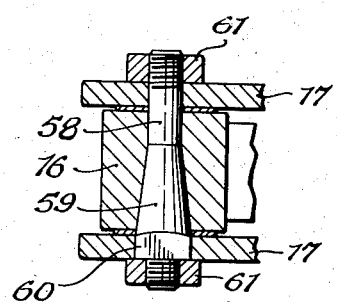

Referring in the first place to the particular embodiment of my invention in the microscope shown in Figs. 1 to 7, 15 represents the base of the microscope which may be of any suitable or usual form and which has an upright pillar 16 on which the main frame 17 of the microscope is mounted by means of an inclination joint. 18 represents the arm of the microscope on which the body tube 19 is suitably mounted, the body tube comprising the usual eyepiece 20 and objectives 21. In the particular construction shown, the body tube is adjustable on the upper end of the arm 18 by means of a coarse adjustment mechanism of any suitable or usual form controlled by means of a coarse adjustment button or knob 22. 24 represents the stage of the microscope which is rigidly mounted on the main frame 17, and the usual sub-stage parts, such as the condenser 25 and the mirror 26 may be mounted in the usual manner on the main frame 17.

The main frame 17 is of substantially U-shape or channel-shape in cross section and has an upwardly extending part 27 which extends partly about the arm 18 and forms a convenient handle by means of which the microscope may be lifted and moved about without placing any undue strains on the arm 18.

In accordance with this invention, I provide fine adjustment means of improved and simplified construction, which include a pivotal mounting of the arm 18 on the main frame of the microscope in such a manner that for the purpose of fine adjustment, the arm is swung about its pivot to move the objective toward and from the stage 24. In order that this movement of the objective may be as nearly vertical as possible, the pivotal connection is arranged so that its axis will be slightly above the level of the upper face of the stage. It will, of course, be obvious that in order to obtain the least lateral component of motion of the objective while it is being moved by the fine adjustment propelling mechanism, the pivotal axis is preferably on the level of the upper face of a microscope slide. Any suitable or desired pivotal connection may be employed for this purpose, and in the construction illustrated, a pivot bolt 29 is provided which extends through suitable holes formed in the legs of the shaped main frame and through the arm 18, and a nut 30 may be provided on this bolt to hold the same securely in place.

The fine adjustment of the arm to swing the same about its pivot may be effected in any suitable or desired manner, but preferably I provide the arm 18 with a lower part 33 which extends beyond the pivotal connection and toward the stage within the U-shaped lower part of the main frame 17. By extending the arm in this direction, the fine adjustment mechanism can be conveniently located below the level of the stage of the microscope where it is readily accessible for actuation by the hand of the user while it rests upon the table or support on which the microscope stands.

A fine adjustment propelling mechanism of any suitable or desired type may be provided for imparting the swinging motion to the arm 18. In the construction shown for this purpose, a fine adjustment shaft 35 is provided which is journalled on a pair of bosses or bearing supports 36 and 37 which may be secured to the sides of the main frame 17 in any suitable manner, for example, by means of screws as shown, see particularly Fig. 6. The main frame is provided with openings through which the fine adjustment shaft 35 extends and which are closed by the bearing supports or bosses 36 and 37. The bearing support or boss 37 has a screw-threaded hole therein with which the screw-threaded portion of the fine adjustment shaft 35 cooperates for moving the shaft in the direction of its length when the same is turned. The other bearing support 36 has a central aperture which forms a bearing in which the fine adjustment shaft 35 may rotate and also move lengthwise. The fine adjustment shaft is provided at opposite ends with knobs or buttons 38, by means of which this shaft may be turned, and the buttons preferably have cylindrical or tubular extensions 39 on their inner faces which extend about the lugs or projections 36 and 37 in telescopic arrangement therewith. These extensions 39 also act as stops to limit the movement of the fine adjustment shaft.

The fine adjustment shaft is provided with a disk-shaped flange or enlargement 40 against which one arm 41 of a fine adjustment lever bears, the lever being pivoted on a rod or pin 42 extending outwardly from an inclined inner face of a transverse wall or member 43 secured to the main frame 17. This transverse member also forms a support for the substage parts of the microscope. The lever has a laterally extending arm or projection 44 having a tapering hole therein and a pin 45 is arranged with one end extending into this tapering hole and the other end extending into a similar tapering hole formed in the lower face of a part of the lower extension 33 of the arm of the microscope, see particularly Figs. 5 and 6. The pin 45 thus forms a pivotal connection between the lever 41 and the arm of the microscope. Consequently, as the fine adjustment shaft 35 is turned and moved to the left in Fig. 6, the lever 41 will be swung about its pivot to raise the part 33 of the arm and thus cause the arm to swing about its pivot 29 in a direction to raise the body tube 19. When the fine adjustment shaft is turned in the opposite direction, the flange 40 will move to the right in Fig. 6 and cause the lowering of the part 33 of the arm and thus a lowering of the body tube 19. Any other means for effecting fine adjustment of the arm 18 about its pivot may be employed.

In order to keep the parts of the fine adjustment propelling mechanism in contact with each other, a spring 48 is preferably provided, which, in the construction shown, Fig. 5, is arranged in a hole 49 in the arm 18 of the microscope. The upper end of the spring reacts against the main frame 17, thus urging the extension 33 of the arm downwardly and cooperating with the weight of the body tube and arm 18 to continuously urge the parts of the fine adjustment propelling mechanism into engagement.

With the microscope thus far described, there may be a very slight horizontal component of the movement of the objective relatively to the object or slide, resulting from the swinging of the arm about the pivot pin 29. In most cases, this slight horizontal movement is not objectionable, but if desired, this slight movement may be compensated for or eliminated by providing for a compensating movement of the objective or stage relatively to the main frame, so that during fine adjustment, there will be substantially no horizontal movement of the objective with reference to the stage.

This may be accomplished by any suitable or desired means, and in the construction illustrated by way of example, I construct the pivotal mounting of the arm in such a manner as to permit a limited horizontal movement of the arm during the swinging of the same. This may be accomplished by enlarging one or more of the holes through which the pivot bolt 29 extends. For example in the construction illustrated, I have shown the hole in the arm 18 slightly elongated in a horizontal direction, see particularly Fig. 5. I have also provided means for producing horizontal movement of the arm 18 while the same is swung about the pivot pin 29 to compensate for the horizontal component of movement that would result if the arm were to swing about a fixed pivot. In the construction shown for this purpose, I provide in the lower portion 33 of the arm at opposite sides thereof recesses or grooves 52 which are inclined at a small angle to the vertical. I also provide in the sides of the main frame member 17 pins 53 which fit into these recesses. These pins, in the construction shown, are provided on the ends of screws 54 arranged in threaded holes in the sides of the main frame 17, see also Fig. 7. Consequently, when the lower end of the arm 18 is adjusted upwardly by means of the fine adjustment propelling mechanism, the inclined recesses 52 cooperating with the pins 53 will cause the arm to move to a slight extent laterally in one direction in Fig. 5, and when the fine adjustment propelling mechanism causes the extension of the arm to be lowered, the arm will move horizontally in the opposite direction. By providing the grooves 52 with the correct contour and inclination to the vertical, the horizontal movement of the arm will be just sufficient to compensate for the horizontal component of motion which would result from the swinging of the arm about a fixed pivot, so that with a high power objective, the slide will appear to remain in fixed position during the fine adjustment.

The major portion of the arm 18 may fit loosely within the frame member 17, but in order to prevent any lateral displacement of the arm or objective in focussing, the lower end of the arm is preferably slightly increased in width to bear closely on the inner surfaces of the downwardly projecting legs of the U-shaped main support.

The lower end of the main frame is preferably further reinforced by means of a spacing block 57 rigidly secured between the downwardly extending legs of the U-shaped main frame. This block also serves the further purpose of limiting the swinging movement of said arm in one direction about its inclination joint The inclination joint may be of any suitable or desired construction, that shown in Fig. 4 comprising a bolt 58 extending through the legs of the main frame 17 and the pillar 16 of the base and having a tapered portion 59 which fits into a correspondingly tapered portion of the hole in the pillar 16. A portion of the bolt which extends through one of the legs of the main frame is preferably square as shown at 60, to prevent turning of the bolt relatively to the main frame. The bolt may be secured in place in any usual manner, for example, by means of nuts 61 at the opposite ends thereof, which nuts also serve to wedge the tapered portion of the bolt in the tapered hole in the pillar to the desired extent.

In Figs. 8 to 11, I have shown microscopes in which the course adjustment mechanism is located relatively low so as to be readily accessible by the hand of the user while the same rests on the table or support on which the microscope stands. In this construction, 65 represents the arm of the microscope, on the upper end of which a body tube (not shown) may be rigidly secured and this arm, instead of being pivoted on the main frame of the microscope, as in Figs. 1 to 7, is slidable vertically on a part which is pivoted on the main frame and which is hereinafter referred to as a lower arm part or member. 67 represents a slide bearing 67 of any usual or suitable construction, on the arm 65. The lower arm member or part, as clearly shown in Fig. 9, includes an elongated upright part 68 which is suitably grooved to receive the bearing 67 of the arm 65, and a part 69 which extends toward and below the stage 98 of the microscope. The parts 68 and 69 are rigidly connected to each other by means of a pair of plates 70, thus forming a rigid lower arm structure having a space between the two side plates 70 thereof through which the arm 65 extends.

Any suitable means may be provided for effecting coarse adjustment of the arm 65 with reference to the lower arm member 68, and in the construction shown for this purpose, the arm 65 is provided with a rack 73 secured thereto, and a pinion 74 secured on a pinion shaft 75 and meshing with the rack. The pinion shaft is journalled on the lower arm part 68 and extends through enlarged holes of a main frame member 76 which is also of substantially U-shaped or channel cross section. Coarse adjustment buttons or knobs 77 are mounted on the ends of the coarse adjustment 75 for turning this shaft. The pinion 74 may be held in place on the lower arm part 68 by means of a block 78, see particularly Fig. 10, which is removably secured to the part 68, the bearings for the shaft being formed partly in the part 68 and partly in the block 78.

The lower arm member 68 is pivotally connected with the main frame 76 for fine adjustment of the arm of the microscope, by means of a pivot bolt 80, which may be mounted to permit slight horizontal movement of the bolt. This may be accomplished in a manner similar to that shown in connection with the pivot bolt or pin 29 shown in Figs. 1 to 3 and 5, or this pivot bolt 80 may extend through horizontally elongated holes in the two legs of the frame member 76.

The fine adjustment propelling mechanism shown in the drawing is substantially identical with the one described in connection with Figs. 1 to 7, and is, therefore, not again described in detail. This fine adjustment propelling mechanism includes a shaft 82 having its ends rotatably mounted in the main frame 76 and having a flange 83 which acts on an arm of a lever 84 pivotally mounted on a block or part 85 secured to and between the two legs of the main frame 76, the bolt acting through the medium of a pin 86 on the part 69 of the lower arm member. A spring 88 holds the parts of the fine adjustment propelling mechanism in contact with each other, as does the spring 48 shown in Fig. 5. If it is desired to eliminate horizontal movement of the objective on the arm 65 with reference to the object, a pair of guide grooves 89 may be provided in the side of the lower arm part 69 in which pins engage which may be constructed similar to those shown in Fig. 7, the grooves 89 being of such shape and inclination as to eliminate or materially reduce the horizontal component of movement of the objective during fine adjustment of the arm 65 about its pivot bolt or pin 80.

The main frame may be pivoted by means of a bolt 90 which also extends through pillars 91 projecting upwardly from a base 92, thus forming an inclination joint about which the microscope as a whole may be swung.

In this construction, it will be seen that the coarse adjustment moves the arm in a direction substantially perpendicular to the upper surface of the stage 70 and the fine adjustment propelling mechanism moves both the arm 65 and the arm members or parts 68, 69 and 70 about the pivot 80 for effecting fine adjustment.

In Fig. 11, I have shown a microscope similar in construction to the one shown in Figs. 8 to 10, except that the inclination joint is omitted, in which case, the main frame member 95 extends downwardly to a slightly greater extent than the frame member 76 shown in Figs. 8 to 10 and is rigidly secured directly to the base 96 of the microscope.

The constructions shown and described have the advantage that the pivotal mounting of the microscope arm on the main frame is easily constructed with the required accuracy, and is strong and reliable in operation.

I claim as my invention:

1. A microscope having a main frame, a body tube carrying arm pivotally mounted on said main frame, means for effecting adjustment of said arm by swinging said arm about its pivotal mounting, and means for shifting the first of said arm laterally while the same is swinging to produce substantially straight line movement of the lower end of said body tube carried by said arm.

2. A microscope comprising a main frame having a stage mounted thereon, a body tube including an objective, an arm carrying said body tube directly attached thereto pivotally mounted on said main frame on an axis lying approximately on the level of the upper surface of said stage, a fine adjustment propelling mechanism acting on said arm for swinging the same and said body tube about the pivotal connection with said main frame, and means for producing relative movement of said stage and said objective in a direction substantially parallel with said stage during swinging of said arm to reduce displacement of said objective in a direction other than perpendicular to said stage.

3. A microscope comprising a main frame having a stage mounted thereon, a body tube including an objective, an arm carrying said body tube and having a pivotal connection with said main frame which is slidable in a direction substantially parallel with said stage, a fine adjustment propelling mechanism acting on said arm for swinging the same about said pivotal connection, and means for moving said pivotal connection during said fine adjustment to reduce displacement of said objective in a direction other than perpendicular to said stage.

4. A microscope comprising a main frame having a stage mounted thereon, a body tube including an objective, an arm carrying said body tube and having a pivotal connection with said main frame which is slidable in a direction substantially parallel with said stage, a fine adjustment propelling mechanism acting on said arm for swinging the same about said pivotal connection, and cooperating parts on said arm and said frame including a groove and a pin slidable in said groove for imparting movement to said arm in a direction substantially parallel to said stage when the arm is swung about its pivotal connection, to reduce displacement of said objective in a direction other than perpendicular to said stage.

5. A microscope having a main frame of substantially inverted U-shaped cross section, an arm pivoted on said frame and having a portion thereof arranged within said frame and another portion extending out of said frame, a body tube mounted on said other portion of said arm, a fine adjustment propelling mechanism including a shaft journalled in said frame and having a threaded part engaging a correspondingly threaded part of said frame, an outwardly extending annular flange rigid on said shaft, a lever pivoted on said frame and having one arm engaging said flange, and a connection between said lever and said arm for swinging said arm about its pivot.

6. A microscope including a main frame, a body tube, an arm on the upper portion of which said body tube is mounted, a lower arm part pivoted on said frame, an upright sliding bearing connecting the lower portion of said arm and said lower arm part, coarse adjustment mechanism for moving said arm relatively to said lower arm part, and a fine adjustment propelling mechanism acting on said frame and said lower arm part for swinging said arm part and said arm to effect fine adjustment of said body tube, by swinging said arm, said lower arm part and said body tube as a unit about the pivotal connection of the lower arm part and the frame.

7. A microscope including a main frame of substantially inverted U-shape in cross section, a body tube carrying arm on which the body tube is rigidly secured, a lower arm part on which said arm is slidably mounted for coarse adjustment of said arm, said lower arm part being pivotally mounted on said frame and having a substantially horizontally extending portion arranged in said frame, fine adjustment propelling means in said frame and acting on said portion of said lower arm part to swing said arm part, said arm and said body tube for fine adjustment of said arm and body tube.

8. A microscope including a main frame of substantially U-shaped cross section and including a lower substantially horizontal portion and an upwardly extending portion, a body tube carrying arm extending into said upwardly extending portion of said frame and having a part thereof exterior of said frame constituting the sole support for said body tube, a lower arm part extending into said horizontal part of said frame and having a sliding bearing connection with said arm for coarse adjustment of said arm and pivotally mounted on said frame, and a fine adjustment propelling mechanism in said horizontal portion of said frame remote from said pivotal mounting and acting on said lower arm part to swing said arm and the body tube about said pivotal mounting for effecting fine adjustment of said body tube.

9. A microscope including a main frame having a stage mounted thereon, an arm pivotally mounted on said main frame, a body tube carried solely by said arm to swing with said arm about said pivotal mounting, a coarse adjustment mechanism for moving said body tube relatively to said arm toward and from said stage, and a fine adjustment propelling mechanism beneath the stage acting on said arm to swing the same about its pivotal connection to move said body tube toward and from said stage, said pivotal connection between said arm and said main frame including a bolt extending through holes in said main frame and said arm, at least one of said holes being of non-circular cross section elongated in a direction substantially parallel with said stage.

HARVEY N. OTT.

REFERENCES CITED

The following references are of record in the file of this patent:

UNITED STATES PATENTS

| Number | Name | Date |
|---|---|---|
| 475,362 | Thomas | May 24, 1892 |
| 577,344 | Bausch | Feb. 16, 1897 |
| 1,267,862 | Haefliger | May 28, 1918 |
| 1,377,069 | Hartness | May 3, 1921 |
| 1,575,784 | O'Meara | Mar. 9, 1926 |
| 1,933,386 | Ott | Oct. 31, 1933 |
| 1,984,127 | Gallasch | Dec. 11, 1934 |

FOREIGN PATENTS

| Number | Country | Date |
|---|---|---|
| 15,545 | Germany | Sept. 23, 1881 |
| 546,693 | Germany | Mar. 16, 1932 |